Oct. 31, 1961 N. L. WISEMAN 3,006,998

BINARY SIGNAL DEMULTIPLEXING DEVICE

Filed July 17, 1959 2 Sheets-Sheet 1

INVENTOR.
NEIL L. WISEMAN

BY [signature]

ATTORNEY

Oct. 31, 1961 N. L. WISEMAN 3,006,998

BINARY SIGNAL DEMULTIPLEXING DEVICE

Filed July 17, 1959 2 Sheets-Sheet 2

United States Patent Office 3,006,998

Patented Oct. 31, 1961

3,006,998

BINARY SIGNAL DEMULTIPLEXING DEVICE

Neil L. Wiseman, Rochester, N.Y., assignor to General Dynamics Corporation, Rochester, N.Y., a corporation of Delaware Filed July 17, 1959, Ser. No. 827,788
5 Claims. (Cl. 178—52)

The present invention relates to binary signal demultiplexing devices and, more specifically, to a binary signal demultiplexing device employing only solid state components.

In applications which utilize binary signal representations of characters expressed in binary form, it is frequently expedient to time position multiplex the bits of the binary code employed. This is particularly true in the area of communications wherein the message transmitting facilities may be operated at a much higher speed than that at which messages may be generated. In these applications, therefore, it has been found to be practical to time position multiplex the binary signals emanating from a plurality of signal sources for rapid transmission over the available transmitting facilities whereby the messages emanating from a plurality of sources may be transmitted in a much shorter time interval than that required for the generation of these messages.

As the use of binary code signal representations in the communications area is becoming increasingly widespread, the importance of a demultiplexer device which is economical in construction and reliable in operation is apparent.

It is, accordingly, an object of this invention to provide an improved binary signal demultiplexing device.

It is another object of this invention to provide an improved binary signal demultiplexing device employing only solid state components.

In accordance with this invention, a demultiplexer device of the type which may be selectively rendered sensitive to any time position within each frame of a series of multiplex binary signals and characterized by the production of an output signal pulse corresponding to the polarity bits selected to be significant and the absence of an output signal pulse corresponding to the other polarity bits appearing during the selected time position is provided wherein an enabling signal may be produced during any selected time position within each frame of the multiplexed binary signals which, when coincidentally applied to a gating circuit arrangement in coincidence with a binary signal representation of a significant bit will produce an output signal during that time position.

For a better understanding of the present invention, together with further objects, advantages and features thereof, reference is made to the following description and accompanying drawings in which.

To facilitate the description of the operation of the multiplexer device of this invention, and without intention or inference of a limitation thereto, a specific example of an application of a device of this type is in the teletypewriter switching art. In this area, it has been found that messages may be transmitted at a much greater rate than that at which they may be generated. Therefore, it has been found to be expedient to transmit messages which are originated at a plurality of stations on a time position multiplexing scheme wherein each generating source is assigned a specific time position within a frame which includes all of the time positions assigned and during which a single information bit from the generating source assigned thereto is transmitted.

Figure 1:
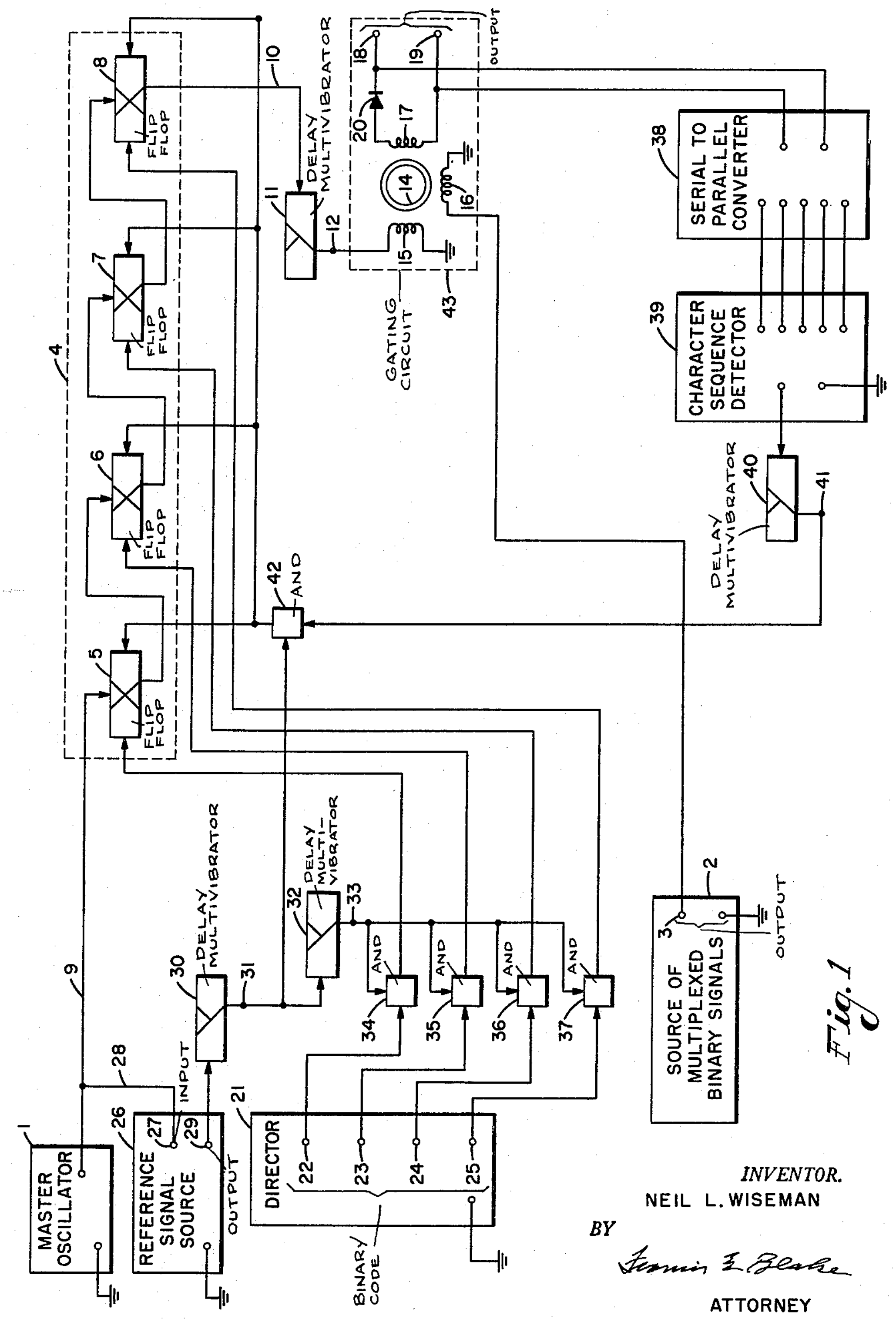
FIGURE 1 illustrates schematically a preferred embodiment of the present invention.

For purposes of this specification, it will be assumed that the messages being generated at fifteen sources are being time division multiplexed and that each of the generating sources is assigned a specific time position. In communication systems of this type, there is generally reserved one time position which is not assigned to any of the generating stations during which certain required switching functions are performed. Therefore, each frame of the multiplexing system to be hereinafter described will comprise sixteen time positions, one for each of the message generating sources and one reserved for the performance of certain required functions which will be brought out in detail later. In any of the time division multiplexing systems, there is required a master timing device or clock which produces a pulse at the beginning of each of the time positions. This master timing device or clock may be any stable oscillator device designed to operate at the required frequency and, since the details form no part of this invention, it is illustrated in FIGURE 1 in block form by reference numeral 1. As this oscillator is the master timing device or clock, the pulses produced thereby are the reference for timing all of the remaining elements of the system. These master clock pulses are diagrammatically indicated by curve A of FIGURE 2 as short square-wave pulses occurring at the beginning of each time position.

A source of multiplexed binary signals which may be any of the conventional types, for example, a tape reader or one of the several buffer storage schemes, is illustrated in block form in FIGURE 1 by reference numeral 2 in that the details form no part of this invention and are well known. In binary data communicating systems, either polarity information bits are generally selected to be significant and are evidenced by the presence of a signal pulse while the other polarity information bits are evidenced by the absence of a signal pulse. For purposes of clearly describing this invention, it will be assumed that the "mark" polarity bits of the binary code have been selected to be significant and will be evidenced by the presence of a signal pulse while the "space" polarity bits will be evidenced by the absence of a signal pulse. These multiplexed binary signals may be taken from source 2 through terminal 3 and will appear as a series of signal pulses and absence of signal pulses, depending upon the polarity of the bit being transmitted. Referring to curve I of FIGURE 2, which diagrammatically illustrates the signals which may emanate from source 2, the narrow square-wave pulses appearing during time positions 1, 2, 3, 4, 9, 11, 14 and 15 indicate that "mark" polarity bits are present during these time positions and the absence of pulses during time positions 5, 6, 7, 8, 10, 12 and 13 indicate that "space" polarity bits are being transmitted during these time positions of the same frame. It may be noted that during the next frame, there may be "space" polarity bits present during time positions 1 and 2 with "mark" polarity bits again present during time positions 3 and 4. As the sixteenth time position herein arbitrarily labeled as "0," has been selected to be the time position which is reserved for performing certain necessary functions and not assigned to any of the message generating sources, there will not be a pulse present during this time position within any of the frames.

Figure 2:
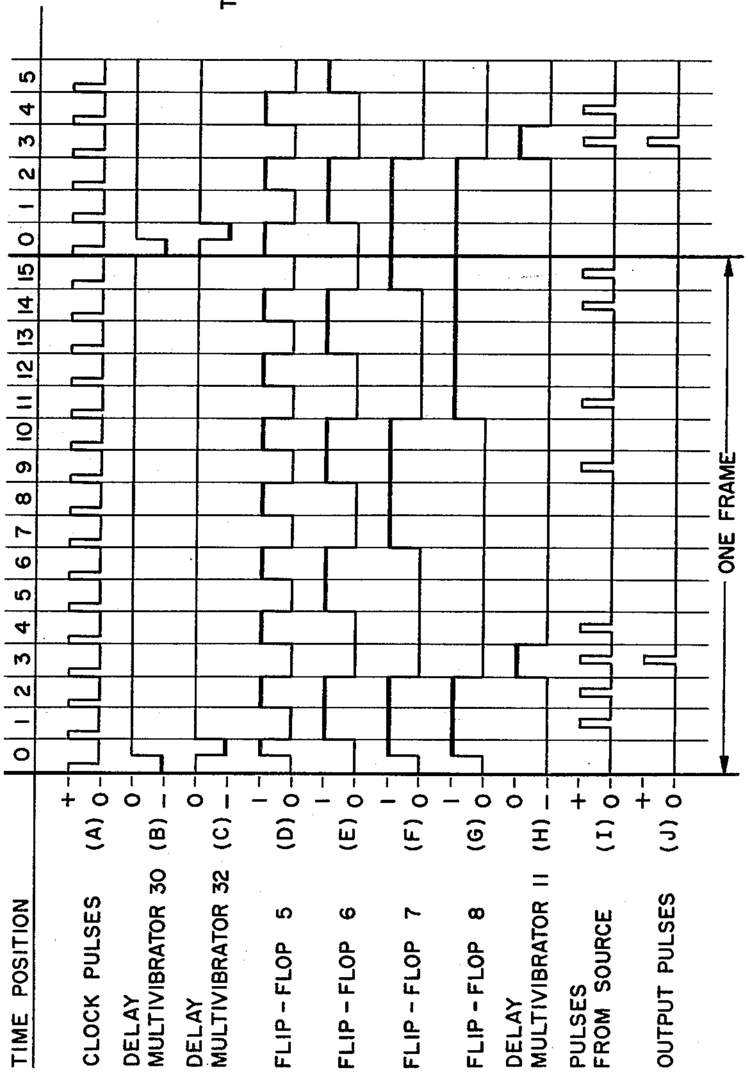
FIGURE 2 is a timing diagram useful in understanding the operation of the multiplexing device of this invention.

To produce an enabling signal, the significance of which will be detailed later, during any selected time position within each frame, a four-stage binary counter, comprising the elements contained within the dashed-line rectangle 4 of FIGURE 1, may be employed. This binary counter includes four conventional flip-flop circuits each of which is shown in block form by reference numerals 5, 6, 7 and 8 and is driven by the clock pulses from master oscillator 1 which are applied to the input terminal of flip-flop 5 through lead 9, as indicated. With this arrangement, therefore, an output pulse will appear in lead 10, which is connected to the output terminal of the final stage flip-flop circuit 8 of the binary counter, as indicated, with every sixteenth clock pulse. So that this output signal may be produced in lead 10 during any selected time position within each frame, it is only necessary to preset the binary counter circuit to the complement of the number of the time position in respect to a base 16. That is, to produce an output signal during the third time position it is necessary that the binary counter be preset to the binary representation of the numeral 13. Similarly, for the twelth time position, it is necessary that the binary counter be preset to the binary representation of the numeral 4. Since the time position arbitrarily labeled as "0" in FIGURE 2 is the time position which has been selected to be reserved, this preset function may be accomplished during that time position in a manner to be later explained. As a pulse is produced in lead 10 with each sixteenth pulse from master oscillator 1, this pulse may be produced during any selected time position within the frame as determined by the complement which is preset into the binary counter.

To provide a strong enabling pulse of a duration long enough for one time position, a delay multivibrator, the details of which are well known in the art and form no part of this invention and indicated in block form by reference numeral 11, may be employed. Delay multivibrators of this type are conventional in design and normally operate in a stable condition of operation, hereinafter referred to as the stable state, but may be triggered to an alternate condition of operation, hereinafter referred to as the alternate state, through the application of an input signal thereto. After being triggered to the alternate state, upon the expiration of a selected time duration designed into the circuitry, multivibrators of this type spontaneously return to the stable state. The pulse which appears on lead 10 with each sixteenth pulse from master oscillator 1 is applied to the input terminal of delay multivibrator 11 and serves as the trigger signal which produces therein the alternate state. Upon the expiration of a time interval of a duration equal to one time position, delay multivibrator 11 spontaneously returns to its stable state, in which state it remains until retriggered by a pulse appearing on lead 10 as produced by the sixteenth clock pulse. Delay multivibrator 11 is arranged in such a manner that while in its stable state, a negative potential signal is present upon its output terminal 12. However, upon being triggered to its alternate state by a pulse in lead 10, a ground potential enabling signal is present upon output terminal 12, which is employed in a manner to be later explained.

So that an output signal pulse may be produced with each occurrence of a "mark" polarity bit during the selected time position, the necessary circuitry which is responsive to the coincident application of the ground potential enabling signal present upon output terminal 12 of delay multivibrator 11 and the "mark" polarity bits, selected to be significant, from signal source 2, is necessary. This circuitry may include a magnetic core 14, composed of a magnetic material possessing substantially square hysteresis loop characteristics. While this core is indicated as being toroidal in form, a magnetic core of any shape may be used. Magnetic cores of this type are characterized by two stable conditions of magnetic saturation, commonly referred to as the "P" and the "N" conditions. Either of these conditions of magnetic saturation may be produced through the energization of coils coupled thereto as either "P" or "N" sense windings. With each reversal of stable states, magnetic cores of this type produce an output pulse which may be induced in output windings coupled thereto.

For purposes of illustration only, it will be assumed that the negative potential signals upon output terminal 12 of delay multivibrator 11 when in the stable state are coupled to magnetic core 14 through coupling winding 15 in such a manner that the resulting flow of current will produce the "N" condition of magnetic saturation in core 14. Further, it will be assumed that the signal pulses which evidence the presence of "mark" polarity bits from signal source 2 when energizing coupling coil 16, will produce the "P" condition of magnetic saturation in core 14. Under these conditions, then, magnetic core 14 will normally be in the "N" condition of magnetic saturation, having been placed there by the current produced by the negative potential signal present upon output terminal 12 of delay multivibrator 11 at all times except during the sixteenth pulse from master oscillator 1.

Coupling windings 15 and 16 may be arranged in such a manner that the presence of a signal pulse evidencing the presence of a "mark" polarity bit energizing coupling coil 16 coincidentally with the negative potential signal upon output terminal 12 of delay multivibrator 11 energizing coil 15, will produce an insufficient number of ampere turns of energy to reverse the condition of magnetic saturation of core 14 but when energizing coupling coil 16 coincidentally with the ground potential enabling signal pulse upon output terminal 12 of delay multivibrator 11 will produce a sufficient number of ampere turns of energy to reverse the condition of magnetic saturation of core 14. As the condition of magnetic saturation of core 14 is reversed, there will be produced in output coupling winding 17 an output signal pulse which may be taken from output terminals 18 and 19 and applied to external equipment, not shown. As there is also an output signal pulse produced in output coupling winding 17 as magnetic core 14 is reset by the negative potential signal upon output terminal 12 of delay multivibrator 11 as it returns to the stable state, diode 20 may be inserted in the output circuit thereof and poled in such a manner as to be nonconductive to the reset pulses.

From the description just given, it is apparent that upon the production of a ground potential enabling signal during any selected time position, the occurrence of a signal pulse from source 2, denoting a "mark" polarity bit, energizing coupling coil 16 will produce enough ampere turns of energy to reverse the condition of magnetic saturation of core 14 resulting in an output signal pulse corresponding to the "mark" polarity bit and that the occurrence of no signal pulse from source 2, denoting a "space" binary bit, will not reverse the condition of operation of magnetic core 14 resulting in no output signal pulse corresponding to the "space" polarity bit.

Associated with a communication system of this type is a director device which monitors the incoming messages, and upon the receipt of a start-of-message signal, senses the signal source from which the message originates. Upon determining the signal source, the director is arranged to produce a four bit per group binary coded decimal output signal which is the complement to the base 16 of the number of the time position assigned that signal source. As the details of this device are well known in the art and form no part of this invention, it is indicated in block form by reference numeral 21. The complement of the time position assigned the originating source appears as a binary coded decimal representation upon output terminals 22, 23, 24, and 25 thereof, wherein terminal 25 represents the most significant bit position. Assuming that time position "3" has been assigned the originating source as sensed by the director 21, an output pulse will appear upon output terminals 25, 24 and 22, which is the binary coded decimal representation of the number thirteen, the complement of 3 in respect to base 16.

To produce a reference signal during each time position labeled "0" in FIGURE 2, a reference signal source, which may also be a binary counter flip-flop chain similar to that indicated within the dotted rectangle 4, is employed and, since the details form no part of this invention is indicated in block form by reference numeral 26. The pulses emanating from master clock 1 are impressed upon input terminal 27 thereof through lead 28, as indicated, and, upon every sixteenth clock pulse and during the time position labeled zero in FIGURE 2, an output reference signal is present upon output terminal 29 thereof. This signal is applied to the input terminal of a conventional delay multivibrator which, since the details form no part of this invention and are well known in the art, is illustrated in block form by reference numeral 30. As delay multivibrator 30 is triggered to its alternate state, a negative potential signal appears upon its output terminal 31. The time delay designed into delay multivibrator 30 is arranged to be equal to substantially one-half the length of each time position. Therefore, upon the expiration of this time duration, the potential appearing at output terminal 31 returns to ground potential after substantially one-half the duration of the "0" time position. The pulses produced by delay multivibrator 30 are diagrammatically illustrated by curve B of FIGURE 2 and are shown to go negative at the beginning of each time position "0," where they remain for substantially one-half the duration of that time position, whereupon the potential returns to ground until the beginning of the next time position "0" of the next frame, as indicated. The significance of these negative potential signals will be brought out later in the specification.

As the potential of output terminal 31 goes from a negative potential to ground potential, the positive-going pulse thus produced serves as a trigger signal to another conventional delay multivibrator 32. As delay multivibrator 32 is triggered to its alternate state by the positive-going wave front pulse present upon output terminal 31, the potential on its output terminal 33 goes from a ground potential to a negative potential. The time duration designed into the circuitry of delay multivibrator 32 is arranged to be of a sufficient length to extend over the remaining one-half of the time position "0." The pulses thus produced by delay multivibrator 32 are diagrammatically illustrated by curve C of FIGURE 2 where the pulses are shown to be negative for the duration of the last half of time position "0," at the conclusion of which it returns to ground potential where it remains until triggered by the positive wave front pulse from output terminal 31 of delay multivibrator 30 at the midpoint of the next time position, "0" of the next frame, as indicated.

The negative potential signal present upon output terminal 33 of delay multivibrator 32 while in the alternate state is simultaneously applied to respective input terminals of four, two input AND gates which, since the details are well known in the art and form no part of this invention, are indicated in block form by reference numerals 34, 35, 36 and 37. AND gates of this type are all conventional in design and require the coincident application of signals to the respective first and second input terminals thereof for the production of an output signal. Therefore, upon the occurrence of the negative potential signal upon output terminal 33 of delay multivibrator 32 together with the signals representing the binary coded decimal representation of the numerical digit 13 which appear as pulses upon output terminals 25, 24 and 22 of director 21, output pulses are produced in the output circuits of AND gates 34, 36 and 37. These output pulses are applied to respective flip-flops 5, 7 and 8, of binary counter 4, thereby placing these flip-flops in their "1" condition, which provides for the presetting of binary counter 4 to the complement of time position "3" in respect to the base 16, or 13. Referring now to FIGURE 2, the curves D, E, F and G diagrammatically illustrate the potential curves of flip-flops 5, 6, 7 and 8, respectively. From this diagram, it may be noted that during the occurrence of the negative potential pulse from delay multivibrator 32, flip-flop 5 is preset to its "1" condition, flip-flop 6 remains in its "0" condition, while flip-flops 7 and 8 are also preset to their "1" condition, which is the binary coded decimal representation of the numeral 13. As the pulses from master oscillator 1 are applied to flip-flop 5 of the binary counter through lead 9, upon the third clock pulse, the final stage flip-flop 8 of binary counter 4 is returned from its "1" condition to its "0" condition, as is indicated in FIGURE 2. This signal which appears in lead 10, is applied to the input terminal of delay multivibrator 11, thereby triggering delay multivibrator 11 to its alternate state, with the resultant ground potential enabling signal upon output terminal 12, thereof, during time position "3," as indicated by curve H of FIGURE 2. Upon the conclusion of the time delay designed into delay multivibrator 11, which is arranged to be of a duration to cover one time position of the frame, the potential appearing upon output terminal 12 again goes negative. Sixteen clock pulses later, the final stage flip-flop 8 of binary counter 4 is again returned from its "1" to its "0" state, thereby producing an output signal in lead 10, which again triggers delay multivibrator 11 to its alternate state, with the resulting ground potential enabling signal upon output terminal 12 thereof, for the duration of the number "3" time position. This sequence of events continues until the binary counter 4 is reset, in a manner to be later explained.

Referring now to curve I of FIGURE 2, which diagrammatically illustrates the pulses energizing coupling coil 16 of magnetic core 14, those pulses appearing during time positions 1 and 2 are ineffective to reverse the condition of operation of magnetic core 14 in that the ground potential enabling signal is not present upon output terminal 12 of delay multivibrator 11, as shown by curve H of FIGURE 2. However, with the third time position and the presence of the ground potential enabling signal upon output terminal 12, the pulse emanating from source 2 during this time position is effective to reverse the condition of operation of magnetic core 14, with the resulting output signal pulse induced in output coupling winding 17, which may be taken from output terminals 18 and 19 and applied to external equipment, not shown. This output pulse is diagrammatically illustrated by curve J of FIGURE 2. As the ground potential enabling signal pulse is removed from output terminal 12 of delay multivibrator 11 at the conclusion of time position "3," and is replaced by a negative potential signal at this time, the current flow thus produced through coupling winding 15 is sufficient to again reverse the condition of operation of magnetic core 14, and prepare it for a further reversal by the next signal pulse denoting a "mark" polarity bit during the third time position. The signal pulse emanating from source 2 during the fourth, ninth, eleventh, fourteenth and fifteenth time positions are, of course, ineffective to reverse the condition of operation of core 14 in the absence of the ground potential enabling signal from delay multivibrator 11. Upon the occurrence of the third time position within the next frame, and the presence of the ground potential enabling signal upon output terminal 12 of delay multivibrator 11, the signal pulse emanating from source 2, denoting the presence of a "mark" polarity bit, energizing coupling winding 16 is again sufficient to reverse the condition of operation of magnetic core 14, thereby producing an output pulse during this time position in output coupling winding 17 which may again be taken from output terminals 18 and 19. This sequence will continue through successive frames until the binary counter 4 is again preset to be sensitive to another time position.

To determine the conclusion of a message, the output signals produced in output coupling windings 17 are monitored by a conventional serial-to-parallel binary code converter illustrated in block form by reference numeral 38. This serial-to-parallel converter may be of the type described in a copending application in the name of Charles R. Fisher, Jr., Serial No. 743,782, filed June 23, 1958, now U.S. Patent No. 2,951,242, and assigned to the same assignee as the present invention. Assuming the use of a five-bit-per-group code, the five outputs of serial-to-parallel converter 38 are impressed upon a character sequence detector, illustrated in block form by reference numeral 39. This character sequence detector may be of the type described in a copending application in the name of Freddy David et al., Serial No. 818,137, filed June 4, 1959, and assigned to the same assignee as the present invention. In the teletypewriter communicating field, the end of each message is signified by the occurrence of a sequence of characters, usually ZCZC. Character sequence detector 39 is arranged to detect only this sequence of characters and, upon the detection thereof, to produce an output signal pulse. This output signal pulse is applied to the input terminal of a conventional delay multivibrator 40, which triggers delay multivibrator 40 to its alternate state. As delay multivibrator 40 is triggered to its alternate state, the potential of output terminal 41 thereof goes from ground potential to a negative potential which is applied to one of the input terminals of a conventional two-input AND gate, illustrated in block form by reference numeral 42. The delay designed into delay multivibrator 40 is designed to be of sufficient time to extend over one frame of the time division multiplex code. As the output signal from reference signal source 26 is produced upon output terminal 29 thereof as master oscillator 1 goes through the time position "0" as previously described, delay multivibrator 30 is triggered to its alternate state, with the resultant negative potential signal upon its output terminal 31, as has been previously defined. This negative potential signal is also applied to the other input terminal of AND gate 42, the resulting output signal thereof being applied to respective reset terminals of flip-flops 5, 6, 7 and 8 of binary counter 4, as indicated. This reset signal resets binary counter 4 to the "0" time position during the first half of time position "0," as determined by the master oscillator and the reference signal source 26, and prepares the counter to be preset during the last half of time position "0" by a binary number present upon the output terminals of director 21 in the same manner as has previously been described.

Figure 3:
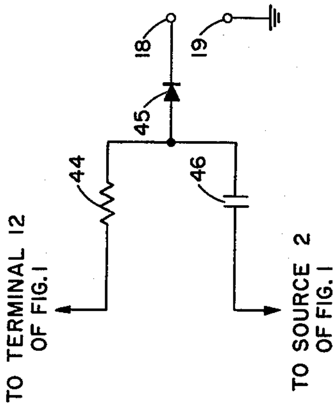
FIGURE 3 is a schematic diagram of alternate circuitry which may be substituted for that included within dashed line rectangle 43 of FIGURE 1.

As an alternate, the equipment contained within dashed rectangle 43 of FIGURE 1 may be replaced by the gating circuitry as indicated in FIGURE 3 where resistor 44 is connected between diode 45 and terminal 12 of delay multivibrator 11 and capacitor 46 is connected between diode 45 and source of multiplex binary signals 2. With this arrangement, during the time the signal upon output terminal 12 of delay multivibrator 11 is negative, diode 45 is back-biased, thereby blocking the passage of positive signal pulses therethrough. However, upon the occurrence of the ground potential enabling signal upon output terminal 12 of delay multivibrator 11, diode 45 is forward-biased, thereby permitting a passage of positive pulses from source 2 therethrough, which may be taken from output terminals 18 and 19 and applied to the external equipment, not shown.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A demultiplexer device for demultiplexing time position multiplexed binary signals appearing only in any single selected time position within a frame consisting of a predetermined number of successive time positions, said device comprising first means including a pulse counter for producing an enabling signal in response to said counter registering a count manifesting said predetermined number, a clock pulse source for applying a pulse to be counted to said counter in each time position, second means coupled to said clock pulse source for priming said counter to register a count equal to the difference between said predetermined number and a selected number time position at the beginning of a frame, whereby said counter registers said predetermined number in response to said selected number of clock pulses being applied to said counter following the beginning of a frame, a source of time position multiplexed binary signals wherein each significant bit is characterized by a pulse of given characteristics, and coincidence means coupled to said source of time position multiplexed binary signals and to said first means for producing an output only in response to the coincident application of a pulse of said given characteristics and said enabling signal.

2. The demultiplexer device defined in claim 1, wherein said pulse counter is a binary pulse counter.

3. The demultiplexer device defined in claim 1, wherein said first means further includes a delay multivibrator coupled to said counter for producing an enabling signal comprising a pulse having a duration substantially equal to the duration of a time position in response to said counter registering a count manifesting said predetermined number.

4. The multiplexer defined in claim 1, wherein said second means includes a reference signal source coupled to said clock pulse source for producing an output at the beginning of each frame, a first delay multivibrator coupled to said reference signal source for producing a first control pulse having a duration substantially equal to the first half of the first time position in response to the output from said reference signal source, a second delay multivibrator coupled to said first delay multivibrator for producing a second control pulse having a duration substantially equal to the second half of said first time position in response to the lagging edge of said first control pulse, third means including a plurality of marking conductors for selectively placing electrical markings on said conductors in accordance with the value of the difference between said predetermined number and said selected number, an AND circuit individual to each of said marking conductors, all said AND circuits being coupled to said second delay multivibrator for producing an output from each AND circuit only in response to the simultaneous presence of said second control pulse and an electrical marking on the conductor individual to that AND circuit, and fourth means for applying the outputs of said AND circuits to said counter to effect the priming thereof.

5. The demultiplexer device defined in claim 4, further including fifth means responsive to successive outputs of said coincidence means manifesting a predetermined character sequence for producing a third control pulse and an additional AND circuit coupled to said first delay multivibrator and said fifth means for producing an output only in response to the presence of both said first and third control pulses, and sixth means for applying the output of said additional AND circuit to said counter to effect the resetting thereof.

References Cited in the file of this patent

UNITED STATES PATENTS 2,640,164 Giel et al. ............ May 26, 1953

2,816,169 Pawley ............ Dec. 10, 1957